United States Patent [19]

Jimbo et al.

[11] Patent Number: 5,021,725
[45] Date of Patent: Jun. 4, 1991

[54] CIRCUIT ARRANGEMENT FOR PREVENTING INDUCTIVE INTERFERENCE IN AN ELECTRIC CAR

[75] Inventors: Yoshiji Jimbo; Tsutomu Ozawa, both of Katsuta, Japan

[73] Assignee: Hitachi, Ltd., Tokyo, Japan

[21] Appl. No.: 441,640

[22] Filed: Nov. 27, 1989

[30] Foreign Application Priority Data

Nov. 29, 1988 [JP] Japan .................. 63-301300

[51] Int. Cl.⁵ .............................. H02P 5/00
[52] U.S. Cl. .................... 318/801; 318/807; 310/255
[58] Field of Search ........ 318/139, 798–803, 318/587, 805, 806–811, 139; 361/111, 91, 54, 56, 57; 310/254–256; 105/49, 53–54, 133, 136, 157; 191/2–5

[56] References Cited

U.S. PATENT DOCUMENTS

| | | | |
|---|---|---|---|
| 3,866,702 | 2/1975 | Eastham | 318/139 X |
| 3,940,669 | 11/1974 | Tsuboi et al. | 318/801 X |
| 3,962,612 | 6/1976 | Kawasaki | 318/139 |
| 4,315,203 | 2/1982 | Ibamato et al. | 318/799 X |
| 4,327,313 | 4/1982 | Tsuboi et al. | 318/52 |
| 4,573,098 | 2/1986 | Williston | 361/42 |
| 4,799,125 | 1/1989 | Crofts et al. | 361/111 X |
| 4,825,131 | 4/1989 | Nozaki et al. | 318/52 |

FOREIGN PATENT DOCUMENTS

| | | |
|---|---|---|
| 56-49601 | 9/1979 | Japan . |
| 0059924 | 3/1982 | Japan . |
| 59-209110 | 11/1984 | Japan . |
| 62-104401 | 10/1985 | Japan . |
| 62-114401 | 11/1985 | Japan . |
| 62-123902 | 6/1987 | Japan . |
| 62-213501 | 9/1987 | Japan . |

Primary Examiner—William M. Shoop, Jr.
Assistant Examiner—David Martin
Attorney, Agent, or Firm—Antonelli, Terry, Stout & Kraus

[57] ABSTRACT

An arrangement for preventing inductive interference in an electric car having a power receiver for receiving DC power from a feeder line connected to a DC power supply, an inverter connected between the power receiver and a ground side terminal connected to a rail via a wheel for converting the DC power fed from the power supply into AC power, and a motor driven by the output of the inverter, the arrangement being adapted to prevent a high-frequency signal current transmitted from and/or to a signal station from being affected by inductive interference due to switching currents of the inverter flowing from switching elements of the inverter to a return line by way of a capacitance between a frame and a stator winding of the motor. The inductive interference preventive arrangement has a circuit for making the impedance of an electrical circuit extending from the motor frame to the ground side terminal without passing through the rail smaller than that of an electrical circuit extending from the motor frame to the rail by way of wheels driven by the motor.

5 Claims, 7 Drawing Sheets

CIRCUIT ARRANGEMENT FOR PREVENTING INDUCTIVE INTERFERENCE IN AN ELECTRIC CAR

BACKGROUND OF THE INVENTION

1. Field of the Invention

This invention relates to an arrangement for preventing inductive interference in an electric car and more particularly to an arrangement for preventing inductive interference which is caused by switching currents used for operation of switching elements of an inverter in an inverter-driven electric car and which affects a high-frequency signal current for the electric car.

2. Description of Related Art

Figure 11:
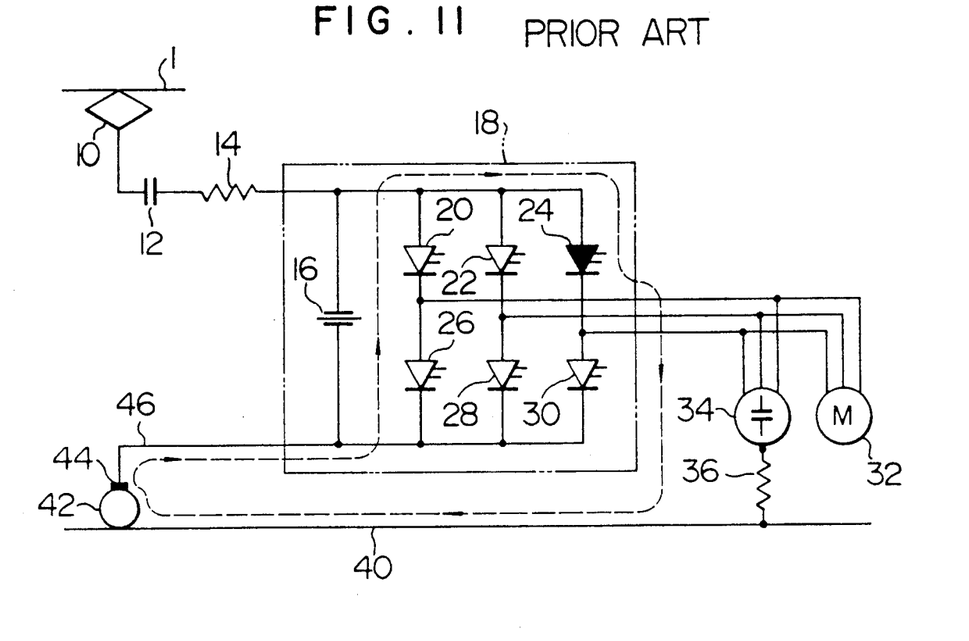
Figure 12:
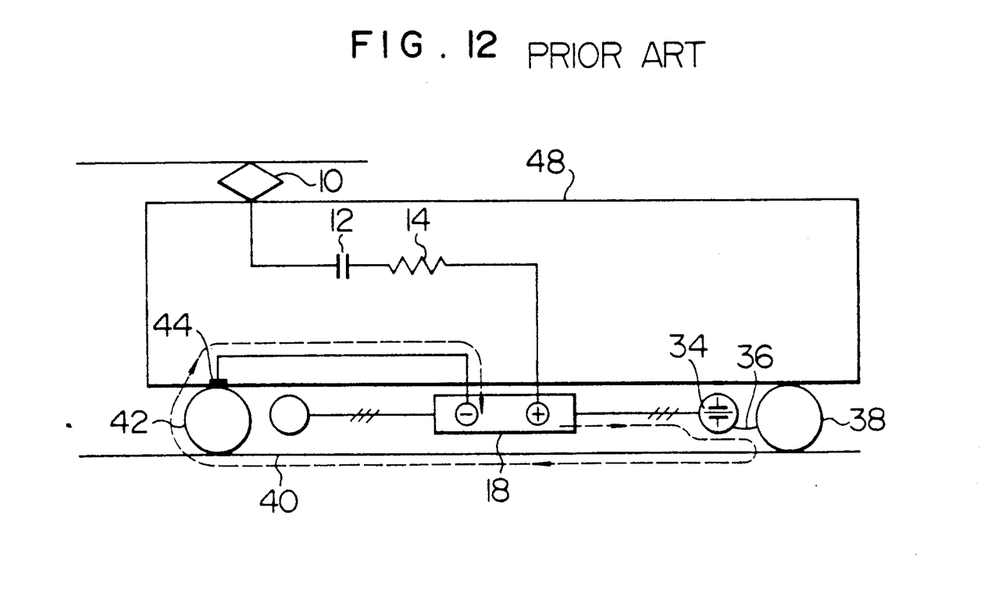

An electric car of the type as shown in FIGS. 11 and 12 has been known wherein an induction motor is driven by means of an inverter based on variable voltage/variable frequency control. In the electric car designated at 48 in FIG. 12, DC power is fed from a feeder line 1 via a pantograph 10, the DC power is then supplied via breaker 12, filter reactor 14 and filter capacitor 16 to an inverter 18 at which the DC power is converted into AC power by means of switching elements 20, 22 and 24 constituting the upper arm and switching elements 26, 28 and 30 constituting the lower arm, and the AC power is applied to an induction motor 32 to drive the same. In the electric car 48 constructed as above, the inverter 18 is controlled with variable voltage/variable frequency to desirably adjust driving torque of the induction motor 32.

The electric car 48 using the inverter 18 however faces, as described in JP-A-62-123902, a problem that a high-frequency signal current, which is transmitted from a ground signal station to another signal station or the electric car through a signal line either directly or superimposed on a DC power current supplied from the feeder line 1, is subjected to inductive interference due to electromagnetic induction from the power line connecting the inverter 18 to the induction motor 32. For prevention of this problem, the power line is mounted as extending from the output of the inverter 18 along a car body of the electric car 48 or using twisted wires, while accommodated in a duct for shielding purpose.

The prior art simply relies on the manner of wiring the power line connecting the inverter 18 and induction motor 32 to eliminate the inductive interference and does not consider a stray capacitance 34 between a stator winding and a frame of the induction motor 32, thus failing to prevent the inductive interference satisfactorily.

Figure 13:
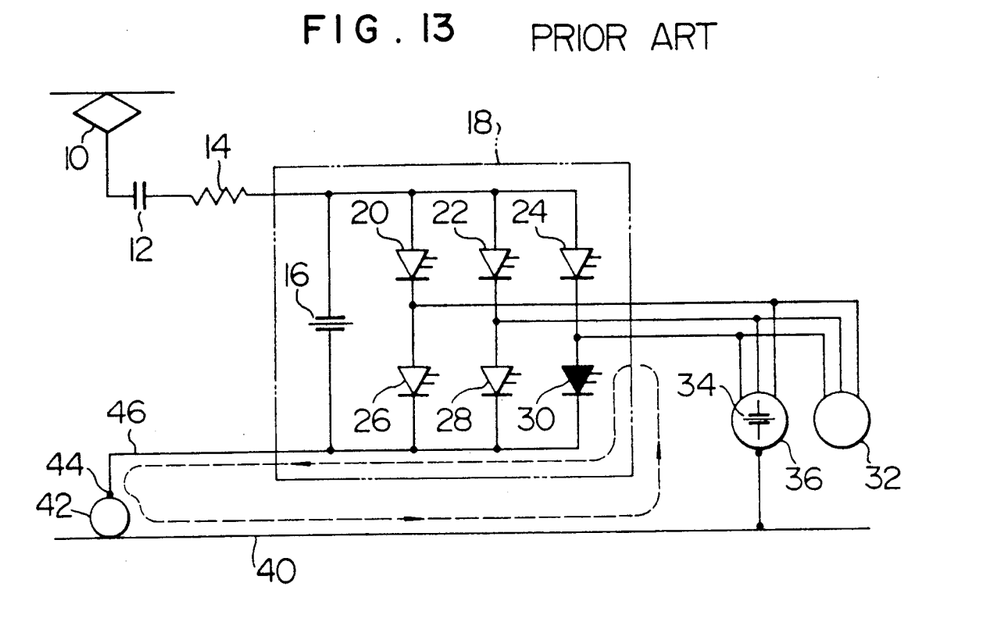
Figure 14:
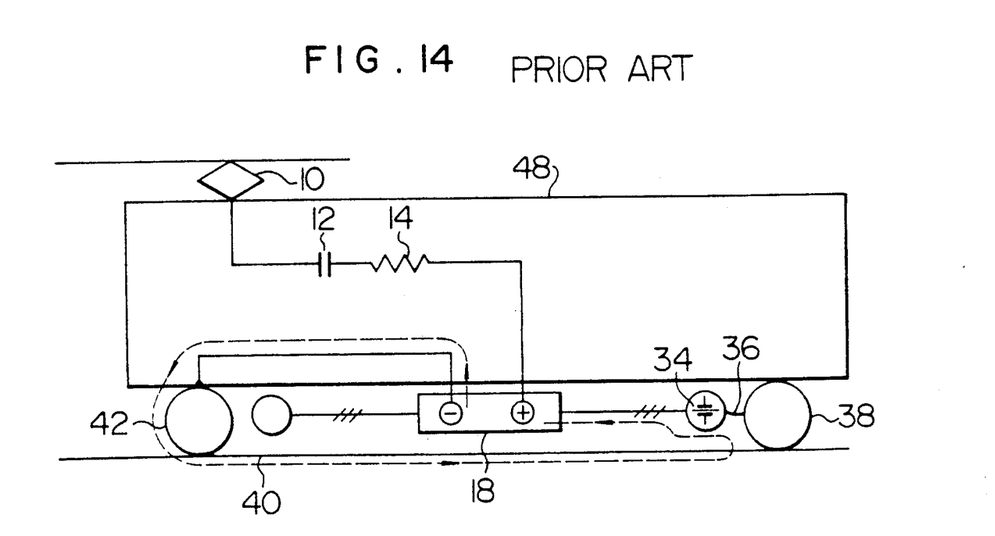

More particularly, the frame of the induction motor is electrically connected to the wheel by way of the chassis and gear unit and an electric resistance across this path can be represented by a contact resistance 36 which totalizes contact resistance between gears included in the gear unit and contact resistance between each gear shaft and an associated bearing. The ground side of the inverter is electrically connected to a wheel 42 by return line 46 and ground brush 44 and drive current for driving the induction motor 32 flows through a closed circuit including a power supply (not shown), the feeder line 1, pantograph 10, inverter 18, return line 46, ground brush 44, wheel 42 and rail 40. Accordingly, in the presence of the stray capacitance 34 between the stator winding the frame of the induction motor 32, the stator winding is electrically connected to a wheel 38 through the stray capacitance 34 and contact resistance 36. Under this condition, when one of the switching elements of the upper arm, for example, switching element 24 is turned on, a loop of the switching element 24, stray capacitance 34, contact resistance 36, wheel 38, rail 40, wheel 42, ground brush 44, return line 46 and filter capacitor 16 is established as shown in FIGS. 11 and 12 to permit the switching current to flow through the rail 40. When one of the switching elements of the lower arm, for example, switching element 30 is turned on, a loop of the switching element 30, return line 46, ground brush 44, wheel 42, rail 40, wheel 38, contact resistance 36 and stray capacitance 34 is established as shown in FIGS. 13 and 14 to permit the switching current to flow through the rail 40. The switching current thus flowing through the rail 40 is a small but sufficient to inductively interfere the ground signal station which uses the rail 40 as signal transmission path.

To prevent the inductive interference due to the switching current of the inverter, JP-A-62-104401 and JP-A-62-114401 make proposals wherein there are provided a first ground circuit for connecting the ground side of the inverter to the wheel 42 via the ground brush 44 and a second ground circuit for grounding casings such as the motor frame and an enclosure box of the inverter to a different wheel from the wheel 42 via a different ground brush from the ground brush 44, and the first and second ground circuits are interconnected together by a by-pass capacitor. However, it has been found that even the above proposals have difficulties in sufficiently preventing the switching current from inductively interfering with a signal current recently used which has a high frequency up to, for example, 200 kHz.

SUMMARY OF THE INVENTION

An object of the invention is to provide an arrangement which can prevent switching currents of the inverter-driven from flowing through the rail in an inverter electric car to thereby avoid the switching currents from inductively interfering with a high-frequency signal current for the electric car.

The inventors have discovered that the conventionally proposed methods can not sufficiently prevent the inductive interference due to the inverter switching current even by connecting the motor frame directly to the grounding brush, because there exists an electrical circuit from the motor frame through the car truck and wheels to the rail due to the electrical connection between the truck and the motor frame and the grounding circuit connected to the car body at any portion between the ground brush and the ground terminal of the inverter, so that, in addition to the main electric circuit directly connecting the motor frame to the ground terminal of the inverter, there are formed many electrical by-passes between them through the car body and the rail, and the switching current flows through the by-passes.

To accomplish the object of the present invention, an arrangement for preventing inductive interference in an electric car is provided according to the invention to comprise circuit means for making the electrical impedance of a main circuit electrically connecting the motor frame to the inverter ground side terminal directly without passing through the car body sufficiently smaller than that of a by-pass circuit electrically connecting the motor frame to the inverter ground side terminal by way of the car body, wheel and rail so as to reduce the switching current of the inverter flowing through the rail to such an extent that the high-frequency signal current is not affected adversely by inductive interference due to the switching current.

In accordance with an embodiment of the invention, in consideration of the fact that, among by-pass circuits electrically connecting the motor frame to the inverter ground terminal via the car body, wheel and rail, the frame-truck-wheel circuit connecting the motor frame to the rail via the truck and wheel has a relatively small electrical impedance, the circuit means is achieved by connecting the motor frame to the inverter ground terminal without intervention of electrical connection to the car body but through the medium of an electrically highly conductive conductor having an impedance which is sufficiently smaller than that of the frame-truck-wheel circuit.

In accordance with another embodiment of the invention, the circuit means includes means for electrically insulating the motor frame from the wheel so as to make the impedance of the frame-truck-wheel circuit connecting the motor frame to the rail via the truck sufficiently large.

BRIEF DESCRIPTION OF THE DRAWINGS

FIGS. 6 and 7 are circuit diagrams useful to explain a path through which the signal current flows when a switching element of the upper arm of the inverter is turned on.

FIGS. 8 and 9 are circuit diagrams useful to explain a path through which the signal current flows when a switching element of the lower arm of the inverter is turned on.

FIGS. 11 and 12 are circuit diagrams useful to explain a path in the prior art through which the signal current flows when a switching element of the upper arm of the inverter is turned on.

FIGS. 13 and 14 are circuit diagrams useful to explain a path in the prior the art through which the signal current flows when a switching element of the lower arm of the inverter is turned on.

DESCRIPTION OF THE PREFERRED EMBODIMENTS

Preferred embodiments of the present invention will now be described with reference to the accompanying drawings.

Figure 1:
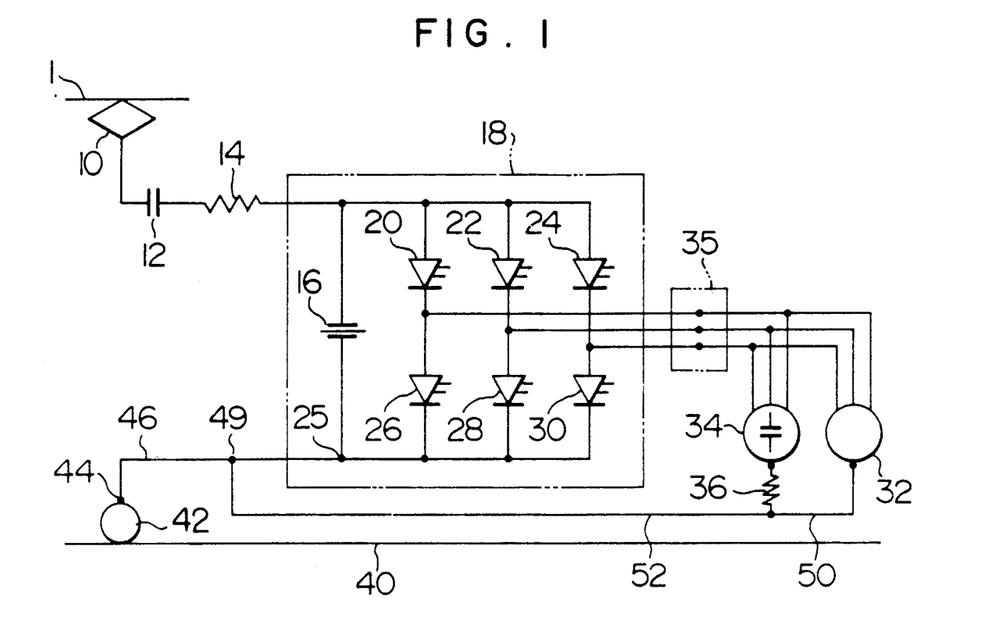
FIG. 1 is a schematic circuit diagram showing an embodiment of the invention.
Figure 2:
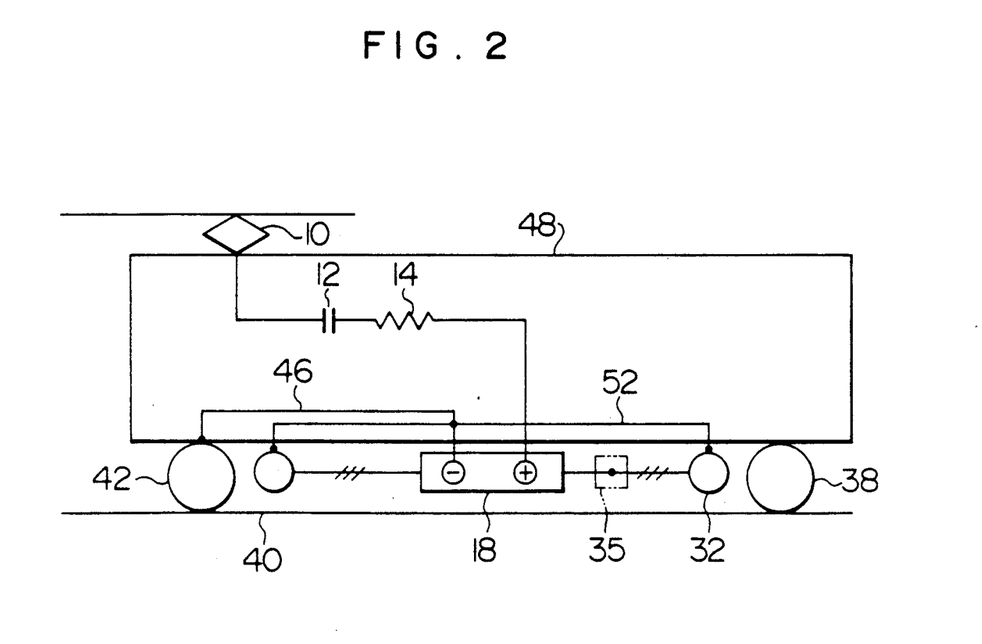
FIG. 2 is a circuit diagram useful to explain a circuit through which the switching current of the inverter flows from the motor frame to the inverter ground side terminal.

Referring particularly to FIGS. 1 and 2, an electric car 48 includes an inverter 18 and an induction motor 32, the inverter 18 being supplied with DC power from power line 1 by way of pantograph 10, breaker 12, filter reactor 14 and filter capacitor 16. The inverter 18 has switching elements 20, 22 and 24 constituting the upper arm and switching elements 26, 28 and 30 constituting the lower arm and individual switching elements are subjected to variable voltage/variable frequency control to drive the induction motor 32. The induction motor 32 is fixed to a car body of the electric car 48 with its frame 50 supported on a motor mount truck (not shown). The frame 50 is then connected to a return line 46 by an electrically highly conductive conductor 52. A junction 49 between the conductor 52 and the return line 46 is a point close to a ground side terminal 25 of the inverter 18, and an electrical circuit extending from the motor frame 50 to the terminal 25 via conductor 52 is so designed as to be insulated from the car body (ground) when disconnected from the return line 46 at the junction 49. Further, even when in the presence of a stray capacitance 34 between stator and frame 50 of the induction motor 32 the output of the inverter 18 is electrically connected to the frame 50 through stray capacitance 34 and contact resistance 36, a circuit extending from the frame 50 to the rail via wheel 38 has an impedance which is higher than that of the circuit connecting the frame 50 to the return line 46 via conductor 52. Conceivably, the impedance of a circuit extending from the frame 50 to the ground side terminal of the inverter via the wheel 38, rail and return line substantially equals the impedance of the circuit ranging from the frame 50 to the rail via wheel 38 because the impedance of the rail and return line is very small.

Figure 3:
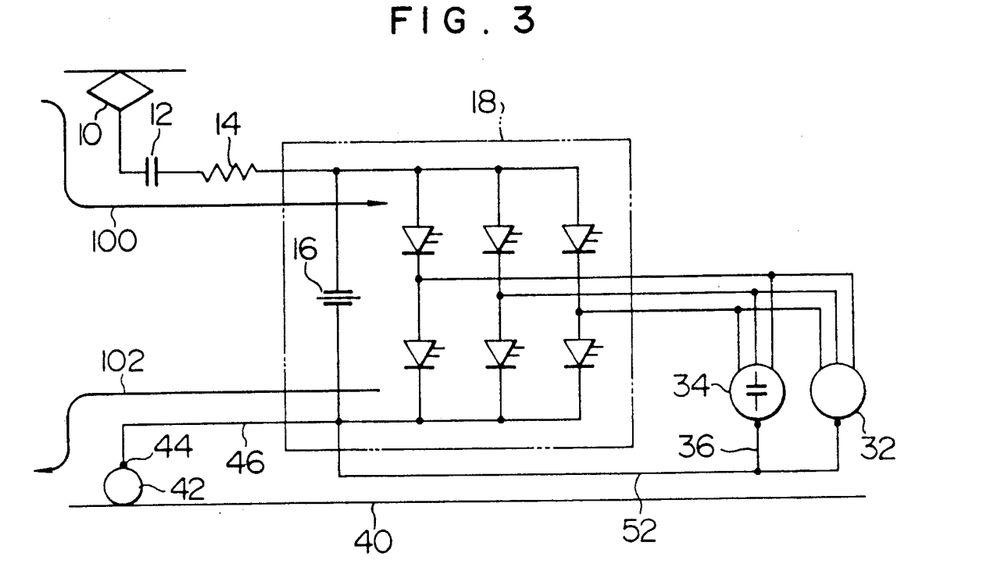
FIGS. 3 and 4 are circuit diagrams useful to explain a circuit through which the high-frequency signal current flows.
Figure 4:
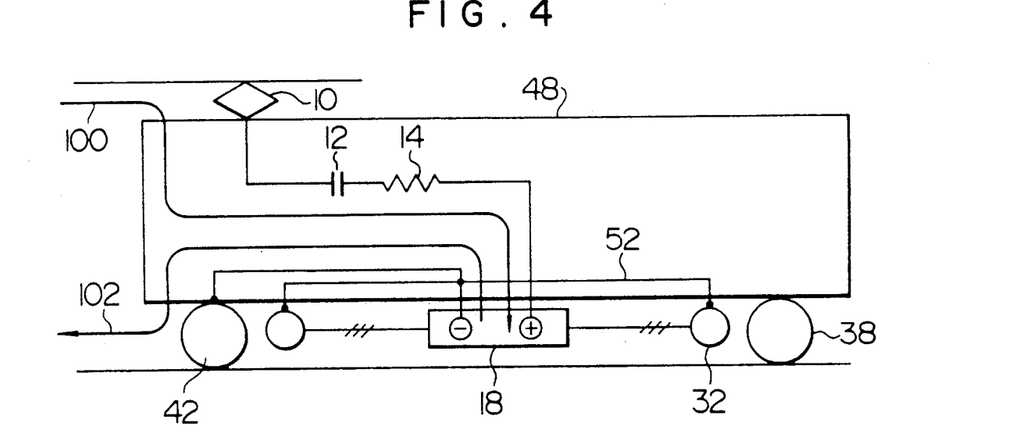
Figure 5:
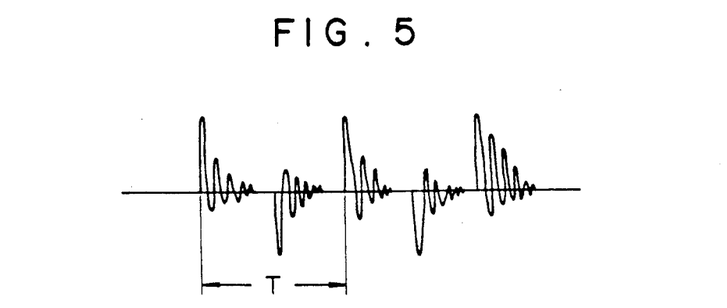
FIG. 5 shows a waveform of the switching current.
Figure 6:
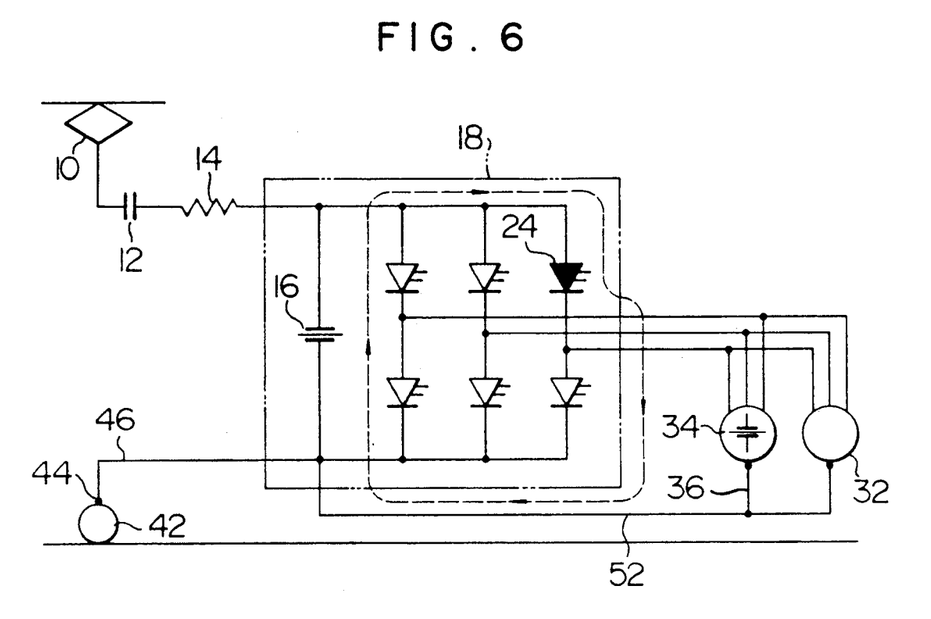
Figure 7:
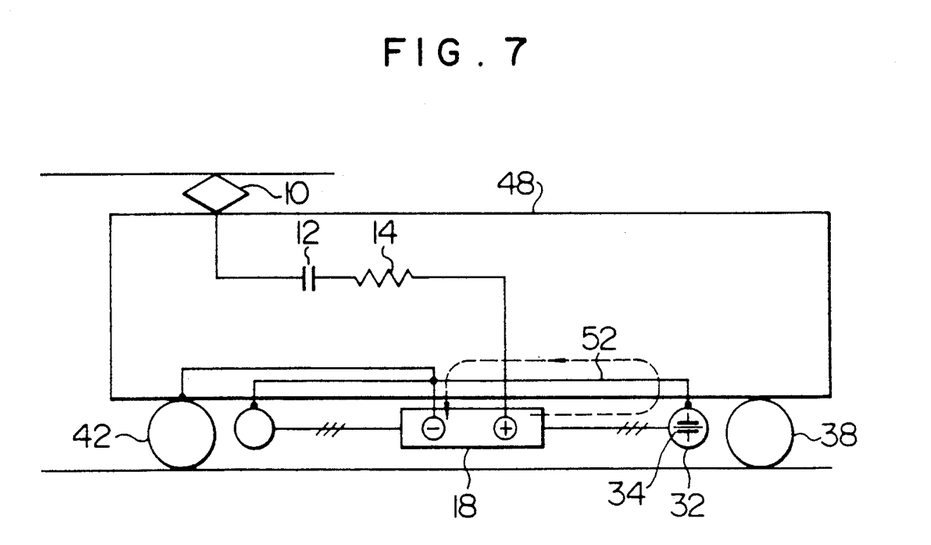
Figure 8:
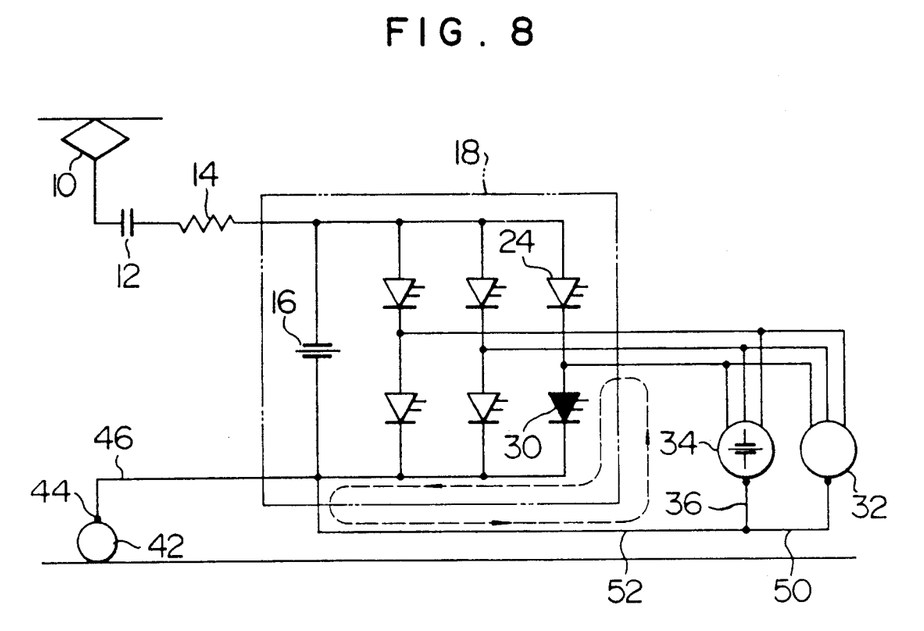
Figure 9:
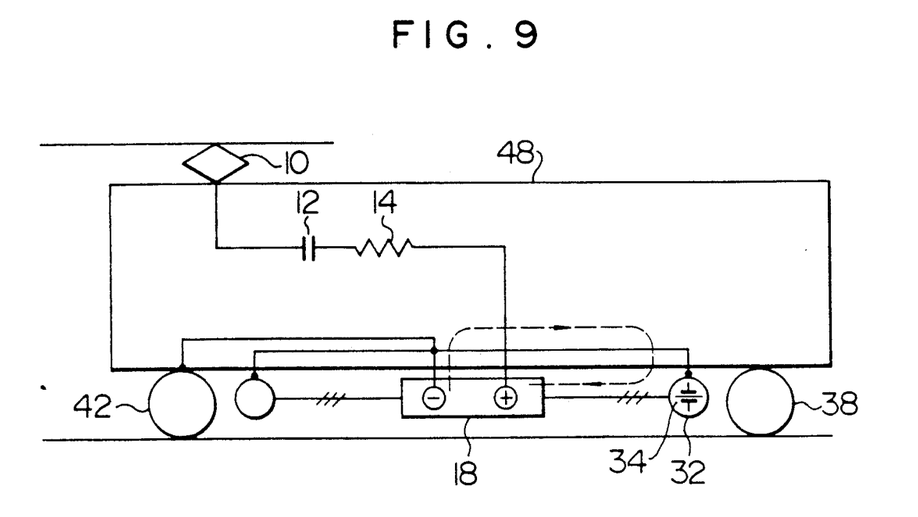

In the electric car 48 constructed as above, a signal current as designated by reference numerals 100 and 102 is supplied, as shown in FIGS. 3 and 4, via the pantograph 10 by being superimposed on a DC current fed from the power supply and it returns to the power supply via inverter 18, return line 46, ground brush 44, wheel 42 and rail 40. At that time, the inverter 18 is subjected to switching control and it delivers a switching current as shown in FIG. 5. Since in this embodiment the frame 50 is connected to the return line 46 by the conductor 52 of low impedance, electric charge stored in the filter capacitor 16 flows, when one of the switching elements 24 is turned on as shown in FIGS. 6 and 7, through a loop of the switching element 24, stray capacitance 34, contact resistance 36, conductor 52, return line 46 and filter capacitor 16. On the other hand, when the switching element 30 of the lower arm is turned on as shown in FIGS. 8 and 9, a loop of the switching element 30, return line 46, conductor 52, contact resistance 36, and stray capacitance 34 is established and a switching current flows through this loop. Consequently, even in the presence of the stray capacitance 34 between the stator winding and the frame of the induction motor 32, the flow of the switching current into the rail 40 is suppressed to prevent the switching current from causing inductive interference with the signal equipments on the ground.

Preferably, wiring work of the electrically highly conductive conductor 52 can be facilitated by interposition of a connection box 35 between the output line of the inverter 18 and the input line of the induction motor 32 as shown in FIG. 2. In addition, by connecting the conductor 52 to the return line 46 at a point near the ground point of the filter capacitor 16, the distance between frame 50 and filter capacitor 16 can be minimized to satisfactorily prevent inductive interference due to current flowing through the conductor 52.

In the foregoing embodiment, the motor frame is connected through the low impedance conductor to the ground side terminal 25 of the inverter connected by the return line 46 to the rail 40. The junction 49 for this connection is disposed as close as possible to the ground side terminal 25. The circuit extending from the frame to the ground side terminal is connected to the car body by way of only the junction and the return line branching therefrom, but is insulated from the car body through the remaining path. The impedance of the circuit extending from the motor frame to the ground side terminal 25 via conductor 52 is made to be smaller than that of a path extending from the motor frame to the rail via the truck and wheel, thereby ensuring that the switching current flowing through the rail can be reduced. Consequently, inductive interference due to the switching current can be prevented.

Figure 10A:
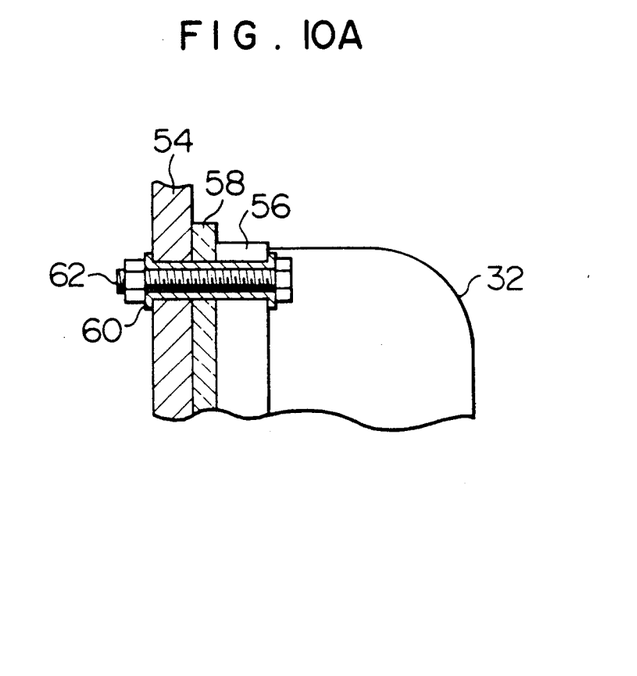
FIGS. 10A and 10B are fragmentary sectional diagrams for explaining another embodiment of the invention, with FIG. 10A showing an example where the motor frame is coupled to the truck through the medium of an insulating material and FIG. 10B showing another example where the rotary shaft of the motor is coupled to the rotary shaft of the wheel drive unit through the medium of an insulating material.
Figure 10B:
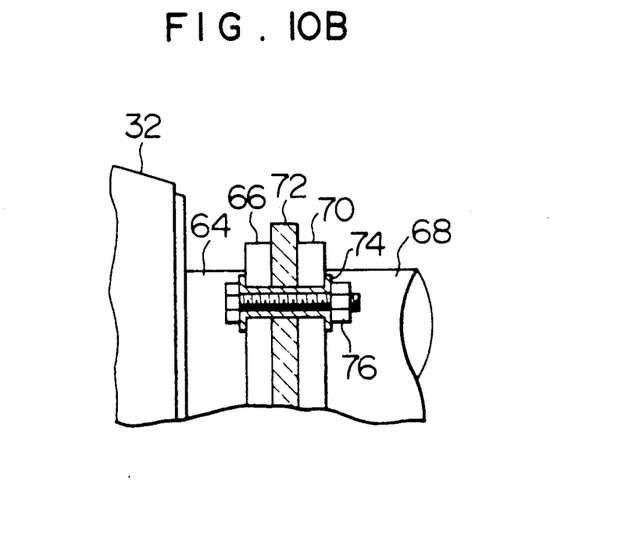

Another embodiment of the invention will now be described with reference to FIGS. 10A and 10B. In this embodiment, for the sake of making the impedance of the circuit extending from the motor frame to the ground side terminal 25 through not the rail but the car body smaller than that of the circuit in the conventional apparatus ranging from the motor frame grounded to the truck to the rail via the truck and wheel, means is provided for electrically insulating the motor from the wheel. Usually, the motor electrically connects to the wheel through an impedance represented by the contact resistance 36 as shown in FIG. 1, and, the circuit extending from the motor frame to the wheel through the truck contributes the most to electrical conduction between the motor and wheel. Therefore, when the motor frame is coupled to the frame with interposition of an insulating material, a great inductive interference prevention effect can be obtained. FIG. 10A shows an example to this effect where a plate 58 made of an insulating material is inserted between a motor mount frame 54 of the truck and a flange 56 of the motor frame, and bolts and nuts 62 for clamping the frame 54 and flange 56 are insulated therefrom by means of sheaths 60 made of an insulating material.

Between the motor and the wheel, there exists, in addition to the circuit including the truck, another circuit extending from the rotary shaft of the motor to the wheel via the rotary shaft thereof. The latter circuit has an impedance larger than that of the former circuit, but is sometimes prone to inductive interference and it should preferably be disconnected electrically. FIG. 10B shows an example to this effect wherein a flange 66 of rotary shaft 64 of the motor 32 is coupled to a flange 70 of rotary shaft 68 of a gear unit (not shown) connected to the rotary shaft of the wheel, with interposition of a plate 72 of an insulating material between the two flanges 66 and 70. Bolts and nuts 74 used for coupling (only one set is shown) are then insulated from the flanges 66 and 70 by means of sheaths 74 made of an insulating material.

By insulating the motor frame from the truck, more preferably, electrically insulating the motor rotary shaft from the wheel rotary shaft in this manner, the impedance of the circuit extending from the motor to the rail via the wheel can be made to be sufficiently larger than that of the circuit extending from the motor frame to the ground side terminal of the inverter without passing through the rail, thereby preventing the switching current of the inverter from flowing through the rail and avoiding the inductive interference due to the switching current.

We claim:

1. A circuit arrangement in an electric car, the electric car including a truck having wheels adapted to be driven on a railway, power receiving means adapted to be connected to a feeder line for receiving DC power from a DC power supply connected to the feeder line, a ground terminal adapted to be connected to the railway through the wheels, a return line connected to the ground terminal, an inverter connected between the power receiving means and the return line for converting the DC power received by the power receiving means into AC power and having output means for outputting the AC power, and a motor, the motor having a motor frame mounted on the truck, a rotary shaft mechanically connected to the wheels for driving the wheels, and a stator winding connected to the output means of the inverter to enable the motor to be driven by the AC power outputted by the output means so as to rotate the rotary shaft to drive the wheels, the circuit arrangement being for preventing a high-frequency signal current from being affected by inductive interference due to switching currents of the inverter flowing from switching elements of the inverter to the return line through a capacitance between the motor frame and the stator winding, the circuit arrangement comprising:

an electrically highly conductive conductor connecting the motor frame to the return line, the conductor being insulated from ground potential when the conductor is disconnected from the motor frame and the return line, and having an impedance smaller than an impedance of an electrical path from the motor frame through the wheels to the railway.

2. A circuit arrangement according to claim 1, wherein the conductor is connected to the return line at a point close to the point at which the ground terminal is connected to the return line.

3. A circuit arrangement according to claim 1, further comprising a connection box enclosing a junction between the output means of the inverter and the stator winding of the motor.

4. A circuit arrangement in an electric car, the electric car including a truck having wheels adapted to be driven on a railway, power receiving means adapted to be connected to a feeder line for receiving DC power from a DC power supply connected to the feeder line, a ground terminal adapted to be connected to the railway through the wheels, a return line connected to the ground terminal, an inverter connected between the power receiving means and the return line for converting the DC power received by the power receiving means into AC power and having output means for outputting the AC power, and a motor, the motor having a motor frame mounted on the truck, a rotary shaft mechanically connected to the wheels for driving the wheels, and a stator winding connected to the output means of the inverter to enable the motor to be driven by the AC power outputted by the output means so as to rotate the rotary shaft to drive the wheels, the circuit arrangement being for preventing a high-frequency signal current from being affected by inductive interference due to switching currents of the inverter flowing from switching elements of the inverter to the return line through a capacitance between the motor frame and the stator winding, the circuit arrangement comprising:

means for electrically insulating the motor frame from the truck so that an impedance of an electrical path from the motor frame to the ground terminal is smaller than an impedance of an electrical path from the motor frame through the wheels to the railway.

5. A circuit arrangement according to claim 4, further comprising means for electrically insulating the rotary shaft of the motor from the wheels.

* * * * *